United States Patent
Lee et al.

(10) Patent No.: US 10,231,011 B2
(45) Date of Patent: **\*Mar. 12, 2019**

(54) METHOD FOR RECEIVING A BROADCAST STREAM AND DETECTING AND CLASSIFYING DIRECT RESPONSE ADVERTISEMENTS USING FINGERPRINTS

(71) Applicant: Enswers Co., Ltd., Seoul (KR)

(72) Inventors: Jaehyung Lee, Seoul (KR); Ji-hoon Song, Seoul (KR); Hoon-Young Cho, Seongnam (KR); Kil-youn Kim, Seoul (KR); David Lonjon, Seoul (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,960

(22) Filed: Feb. 8, 2017

(65) Prior Publication Data

US 2017/0208360 A1 Jul. 20, 2017

Related U.S. Application Data

(63) Continuation of application No. 14/740,234, filed on Jun. 15, 2015, now Pat. No. 9,609,384, which is a
(Continued)

(30) Foreign Application Priority Data

Aug. 7, 2013 (KR) .......................... 10-2013-0093744

(51) Int. Cl.
*H04N 21/44* (2011.01)
*G06K 9/00* (2006.01)
(Continued)

(52) U.S. Cl.
CPC ... *H04N 21/44008* (2013.01); *G06K 9/00758* (2013.01); *G06K 9/3266* (2013.01);
(Continued)

(58) Field of Classification Search
CPC ......... H04N 21/44008; H04N 21/8545; H04N 21/4758; H04N 21/8133; H04N 21/8583;
(Continued)

(56) References Cited

U.S. PATENT DOCUMENTS 5,903,317 A 5/1999 Sharir et al.
8,345,742 B2 1/2013 Lee et al.
(Continued)

FOREIGN PATENT DOCUMENTS

CN 102395991 A 3/2012
CN 102638686 A 8/2012
(Continued)

OTHER PUBLICATIONS

D.A. Sadlier et al., "Automatic TV advertisement detection from mpeg bitstream," Journal of the Patt.Rec.Society, vol. 35, No. 12, pp. 215, Dec. 2002.
(Continued)

*Primary Examiner* — Hoang Vu A Nguyen Ba
(74) *Attorney, Agent, or Firm* — McDonnell Boehnen Hulbert & Berghoff LLP

(57) ABSTRACT

System and method for detecting and classifying direct response advertisements. The system includes a unit for generating an advertisement candidate segment for an advertisement section detected from a broadcast stream; a matching unit for determining whether the candidate segment matches each advertisement segment stored in a database (DB); a unit for, if the matching unit determines that a segment matching the candidate segment is not present, determining whether the candidate segment is a direct response advertisement; a registration unit for storing the candidate segment, determined to be a direct response advertisement, as an advertisement segment that is the direct response advertisement in the DB; and a direct response
(Continued)

advertisement grouping unit for, if the matching unit determines that an advertisement segment matching the candidate segment is present, and the matching segment is a direct response advertisement, grouping the candidate segment with DB-stored advertisement segments that are direct response advertisements.

10 Claims, 8 Drawing Sheets

Related U.S. Application Data continuation of application No. 14/117,369, filed as application No. PCT/KR2013/007475 on Aug. 20, 2013, now Pat. No. 9,084,028.

(51) Int. Cl.
| | | |
|---|---|---|
| *G06K 9/32* | (2006.01) | |
| *G06Q 30/02* | (2012.01) | |
| *H04H 20/14* | (2008.01) | |
| *H04H 60/37* | (2008.01) | |
| *H04H 60/48* | (2008.01) | |
| *H04H 60/56* | (2008.01) | |
| *H04H 60/59* | (2008.01) | |
| *H04N 21/40* | (2011.01) | |
| *H04N 21/81* | (2011.01) | |
| *H04N 21/234* | (2011.01) | |
| *H04N 21/254* | (2011.01) | |
| *H04N 21/266* | (2011.01) | |
| *H04N 21/431* | (2011.01) | |
| *H04N 21/442* | (2011.01) | |
| *H04N 21/475* | (2011.01) | |
| *H04N 21/845* | (2011.01) | |
| *H04N 21/8545* | (2011.01) | |
| *H04N 21/858* | (2011.01) | |
| *H04N 21/4722* | (2011.01) | |
| *H04N 21/4725* | (2011.01) | |
| *H04N 21/4728* | (2011.01) | |
| *H04N 21/433* | (2011.01) | |
| *H04N 21/478* | (2011.01) | |
| *H04N 21/2668* | (2011.01) | |

(52) U.S. Cl.
CPC ..... *G06Q 30/0241* (2013.01); *G06Q 30/0242* (2013.01); *H04H 20/14* (2013.01); *H04H 60/375* (2013.01); *H04H 60/48* (2013.01); *H04H 60/56* (2013.01); *H04H 60/59* (2013.01); *H04N 21/23418* (2013.01); *H04N 21/254* (2013.01); *H04N 21/26603* (2013.01); *H04N 21/40* (2013.01); *H04N 21/431* (2013.01); *H04N 21/4316* (2013.01); *H04N 21/442* (2013.01); *H04N 21/4722* (2013.01); *H04N 21/4725* (2013.01); *H04N 21/4728* (2013.01); *H04N 21/4758* (2013.01); *H04N 21/812* (2013.01); *H04N 21/8126* (2013.01); *H04N 21/8133* (2013.01); *H04N 21/8456* (2013.01); *H04N 21/858* (2013.01); *H04N 21/8545* (2013.01); *H04N 21/8583* (2013.01); *H04N 21/8586* (2013.01); *H04N 21/2668* (2013.01); *H04N 21/4332* (2013.01); *H04N 21/478* (2013.01)

(58) Field of Classification Search
CPC ............ H04N 21/442; H04N 21/4316; H04N 21/8586; H04N 21/40; H04N 21/858; H04N 21/8126; H04H 20/14; H04H 60/48; H04H 60/59
See application file for complete search history.

(56) References Cited

U.S. PATENT DOCUMENTS

| | | | |
|---|---|---|---|
| 8,655,718 | B2 | 2/2014 | Athsani et al. |
| 8,768,772 | B2* | 7/2014 | Schachter ............. G06Q 30/02 705/14.49 |
| 8,825,521 | B2 | 9/2014 | Ellis et al. |
| 9,047,609 | B2 | 6/2015 | Ellis et al. |
| 2007/0016918 | A1 | 1/2007 | Alcorn et al. |
| 2008/0270238 | A1 | 10/2008 | Zweben et al. |
| 2009/0123025 | A1* | 5/2009 | Deng ................. G06K 9/00711 382/100 |
| 2011/0313856 | A1 | 12/2011 | Cohen et al. |
| 2012/0143915 | A1 | 6/2012 | Gupta et al. |
| 2012/0232976 | A1 | 9/2012 | Calman et al. |
| 2013/0185157 | A1 | 7/2013 | Shihadah et al. |
| 2013/0185164 | A1 | 7/2013 | Pottjegort |
| 2013/0227616 | A1 | 8/2013 | Kalva et al. |
| 2014/0222551 | A1* | 8/2014 | Jain .................... G06Q 30/0246 705/14.42 |
| 2015/0026718 | A1* | 1/2015 | Seyller ............... H04N 21/4316 725/34 |

FOREIGN PATENT DOCUMENTS

| | | |
|---|---|---|
| KR | 20110129325 A | 12/2011 |
| KR | 1020130068305 | 10/2014 |
| WO | 2007114796 A1 | 10/2007 |

OTHER PUBLICATIONS

Jinqiao Wang et al., TV Ad Video Categorization with Probabilistic Latent Concept Learning, Proceedings of the International Workshop on Multimedia Information Retrieval, Sep. 28, 2007, pp. 1-10.
Xiaomeng Wu et al., Ultrahigh-Speed TV Commercial Detection, Extraction, and Matching, IEEE Transacations on Circuits and Systems for Video TEchnology, IEEE Service Center, Piscataway, NJ, Jun. 1, 2013, pp. 1054-1069, vol. 23, No. 6.

* cited by examiner

| SEGMENT IDENTIFIER | DR ADVERTISEMENT SEPARATOR | INSTANCE NUMBER | CHANNEL_BROADCAST START TIME | SECTION (SECOND) | FINGERPRINT INFORMATION | SOURCE DATA | ADDITIONAL INFORMATION |
|---|---|---|---|---|---|---|---|
| 990018 | M(990018) | 0 | KBS_20130707:218:30:15 | 45 | | | REGION INFORMATION, CHARACTER STRING INFORMATION |
| 992139 | V(990018, 1) | 0 | FOX_20120611:18:30:00 | 15 | | | |
| 991374 | V(990018, 2) | 0 | | | | | |
| 993137 | M(990018) | 1 | | | | | |
| 991723 | V(990018, 2) | 1 | | | | | |

FIG. 7

METHOD FOR RECEIVING A BROADCAST STREAM AND DETECTING AND CLASSIFYING DIRECT RESPONSE ADVERTISEMENTS USING FINGERPRINTS

CROSS-REFERENCE TO THE RELATED APPLICATIONS

This is a continuation of application Ser. No. 14/740,234, filed Jun. 15, 2015, which is, in turn, a continuation of application Ser. No. 14/117,369, filed Nov. 12, 2013, which is, in turn, a national stage of application number PCT/KR2013/007475, filed Aug. 20, 2013. Furthermore, this application claims also the benefit of priority of Korean application number 10-2013-0093744, filed Aug. 7, 2013. The disclosures of these prior applications are incorporated herein by reference.

TECHNICAL FIELD

The present invention relates, in general, to a system and method for detecting and classifying direct response advertisements (DR ad) and, more particularly, to a system and method for detecting and classifying direct response advertisements, which can detect direct response advertisements provided via broadcasts and group the detected direct response advertisements by identicalness.

BACKGROUND ART

Some television (TV) commercial broadcasts use a scheme for exposing information, such as a phone number, an Internet homepage address, and a price, at a specific location of an advertisement image for a predetermined period of time in order for a viewer or a user to request consultation about an advertised product or to order the corresponding product. Such a type of advertising is referred to as "Direct Response Advertising (DR ad)".

Some of such DR advertisements are delivered after pieces of information about a phone number, an Internet homepage address, and a price have been changed so that, for the same commercial broadcast content, DR advertisements are suitable for the corresponding areas of individual countries or individual areas of a specific country. If, with respect to such changed advertisements produced from the same advertisement, statistical information such as the number of times the corresponding changed advertisement is delivered for each changed form can be provided, this statistical information is very useful.

Meanwhile, as methods of detecting an advertisement when an advertisement is included in a broadcast, technology such as that disclosed in the paper in the following non-patent document is known in the art.

Further, Korean Patent Application Publication No. 10-2011-0129325 (Date of Publication: Dec. 1, 2011) relates to an "Advertisement image detection method and apparatus" and discloses an advertisement image detection method including the steps of dividing each of a plurality of frames of a monitoring target image in which broadcast content and an advertisement image played on an image play device are mixed into partial blocks having a predetermined size; calculating pieces of feature information about respective partial blocks corresponding to a preset location among the partial blocks having the predetermined size; converting the pieces of feature information into a feature information vector; and comparing a feature information vector of a reference advertisement image desired to be detected, which is previously stored in a database (DB), with the feature information vector, thus detecting the reference advertisement image.

However, all of these technologies merely determine whether an advertisement previously registered in the DB is being played during broadcasting, and thus there are limitations in that it is impossible to detect direct response advertisements that induce the direct response of a user and it is also impossible to group direct response advertisements depending on their changed forms.

PRIOR ART DOCUMENTS

Patent Documents

Korean Patent Application Publication No. 10-2011-0129325 (Date of Publication: Dec. 1, 2011)

Non-Patent Documents

D. A. Sadlier et al., "Automatic TV advertisement detection from mpeg bitstream," Journal of the Patt. Rec. Society, vol. 35, no. 12, pp. 215, December 2002.

DISCLOSURE

Technical Problem

Accordingly, the present invention has been made keeping in mind the above limitations, and an object of the present invention is to provide a system and method which can determine whether the corresponding advertisement section corresponds to a direct response advertisement if the advertisement section is detected from a broadcast stream.

Another object of the present invention is to provide a system and method which can group advertisements determined to be direct response advertisements by identicalness.

A further object of the present invention is to provide a system and method which can group direct response advertisements depending on their changed forms, so that various types of statistical information and additional information can be provided for respective changed forms, thus exactly evaluating the efficiency of advertising related to direct response advertising.

Technical Solution

In order to accomplish the above objects, the present invention provides a system for detecting and classifying direct response advertisements, including an advertisement candidate segment generation unit for generating an advertisement candidate segment for an advertisement section detected from a broadcast stream; a matching unit for determining whether the advertisement candidate segment matches each advertisement segment stored in an advertisement database (DB); a direct response advertisement determination unit for, if it is determined by the matching unit that an advertisement segment matching the advertisement candidate segment is not present, determining whether the advertisement candidate segment is a direct response advertisement; a direct response advertisement registration unit for storing the advertisement candidate segment, determined to be the direct response advertisement by the direct response advertisement determination unit, as an advertisement segment that is the direct response advertisement in the advertisement DB; and a direct response advertisement grouping unit for, if it is determined by the matching unit that an advertisement segment matching the advertisement candidate segment is present, and the matching advertisement segment is a direct response advertisement, grouping the advertisement candidate segment with advertisement segments that are direct response advertisements stored in the advertisement DB.

In this case, the direct response advertisement determination unit may be configured to, if an advertisement corresponding to the advertisement candidate segment is a video signal, determine whether the advertisement candidate segment is a direct response advertisement by checking whether a pre-designated character string indicating a direct response advertisement is included in at least one of image frames constituting the advertisement video signal.

Further, the direct response advertisement determination unit may acquire one or more pieces of region information related to a location at which the pre-designated character string is displayed in an image frame, and the direct response advertisement registration unit may store the region information, information about the character string, and information about reliability of checking the character string as advertisement segment information for the advertisement segment in the advertisement DB.

Furthermore, the direct response advertisement determination unit may be configured to, if an advertisement corresponding to the advertisement candidate segment is an audio signal, determine whether the advertisement candidate segment is a direct response advertisement by checking whether a pre-designated audio signal indicating a direct response advertisement is included in the advertisement audio signal.

Furthermore, the direct response advertisement determination unit may acquire one or more pieces of time information related to a location at which the pre-designated audio signal appears, and the direct response advertisement registration unit may store the time information, information about the pre-designated audio signal, and information about reliability of checking the audio signal information as advertisement segment information for the advertisement segment in the advertisement DB.

Furthermore, the direct response advertisement registration unit may set the advertisement segment stored in the advertisement DB to a master segment of the corresponding direct response advertisement.

Furthermore, the direct response advertisement grouping unit may determine whether the advertisement candidate segment is identical to an advertisement segment that is a master segment of the advertisement segment matching the advertisement candidate segment by comparing those segments with each other, and if, as a result of the determination of identicalness, the advertisement candidate segment is identical to the advertisement segment that is the master segment, the direct response advertisement grouping unit may set the advertisement candidate segment as an instance segment of the master segment, whereas if the advertisement candidate segment is not identical to the advertisement segment that is the master segment, the direct response advertisement grouping unit may set the advertisement candidate segment to a variation segment of the master segment.

Furthermore, the direct response advertisement grouping unit may determine whether the advertisement candidate segment is identical to an advertisement segment that is a master segment of the advertisement segment matching the advertisement candidate segment by comparing those segments with each other, if, as a result of the determination of identicalness, the advertisement candidate segment is identical to the advertisement segment that is the master segment, the direct response advertisement grouping unit may set the advertisement candidate segment to an instance segment of the master segment, and if the advertisement candidate segment is not identical to the advertisement segment that is the master segment, the direct response advertisement grouping unit may be configured to determine whether the advertisement candidate segment is identical to an advertisement segment that is a variation segment of the master segment by comparing those segments with each other, and is configured to, if it is determined that the advertisement candidate segment is identical to the advertisement segment that is the variation segment, set the advertisement candidate segment to an instance segment of the variation segment, whereas if it is determined that the advertisement candidate segment is not identical to the advertisement that is the variation segment, set the advertisement candidate segment to a new variation segment of the master segment.

Furthermore, determination of identicalness may be performed by comparing an image of comparing an image of a region corresponding to region information at which the character string, indicating a direct response advertisement and included in the advertisement candidate segment, is located with an image of a region corresponding to region information of a character string for an advertisement segment that is a comparison target.

Furthermore, comparison of the images may be performed based on results of calculation of a distance function between images that are comparison targets.

Furthermore, determination of identicalness may be performed by comparing character string information, which indicates a direct response advertisement and is included in the advertisement candidate segment, with character string information stored for an advertisement segment that is a comparison target.

In accordance with another aspect of the present invention, there is provided a method of detecting and classifying direct response advertisements, including a first step of generating an advertisement candidate segment for an advertisement section detected from a broadcast stream; a second step of determining whether the advertisement candidate segment matches each advertisement segment stored in an advertisement database (DB); a third step of, if it is determined at the second step that an advertisement segment matching the advertisement candidate segment is not present, determining whether the advertisement candidate segment is a direct response advertisement; a fourth step of storing the advertisement candidate segment, determined to be the direct response advertisement at the third step, as an advertisement segment that is the direct response advertisement in the advertisement DB; and a fifth step of, if it is determined at the second step that an advertisement segment matching the advertisement candidate segment is present, and the matching advertisement segment is a direct response advertisement, grouping the advertisement candidate segment with advertisement segments that are direct response advertisements stored in the advertisement DB.

Advantageous Effects

In accordance with the present invention, there can be provided a system and method, which can determine whether the corresponding advertisement section corresponds to a direct response advertisement if the advertisement section is detected from a broadcast stream.

Further, in accordance with the present invention, there can be provided a system and method, which can group advertisements determined to be direct response advertisements by identicalness.

Furthermore, in accordance with the present invention, there is the advantage of providing a system and method, which can group direct response advertisements depending on their changed forms, so that various types of statistical information and additional information can be provided for respective changed forms, thus exactly evaluating the efficiency of advertising related to direct response advertising.

DESCRIPTION OF DRAWINGS

FIG. 7 is a diagram showing an example of advertisement segment information stored in an advertisement database (DB) 60 used in the system 100 of the present invention;

BEST MODE

Hereinafter, embodiments of the present invention will be described in detail with reference to the attached drawings.

Figure 1:
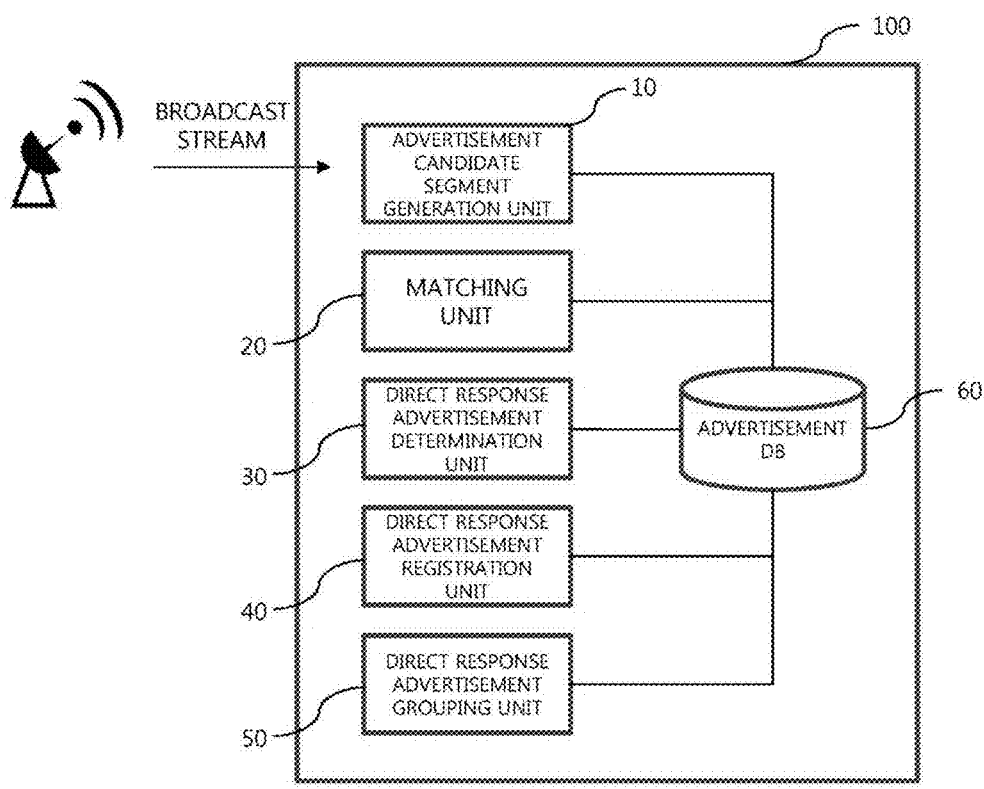
FIG. 1 is a diagram showing the configuration of an embodiment of a system 100 for detecting and classifying direct response advertisements according to the present invention.

FIG. 1 is a diagram showing the configuration of an embodiment of a system 100 for detecting and classifying direct response advertisements according to the present invention (hereinafter referred to as a "system 100").

Referring to FIG. 1, the system 100 includes an advertisement candidate segment generation unit 10, a matching unit 20, a direct response advertisement determination unit 30, a direct response advertisement registration unit 40, and a direct response advertisement grouping unit 50. The system 100 further includes an advertisement database (DB) 60.

The advertisement candidate segment generation unit 10 functions to generate an advertisement candidate segment for an advertisement section detected from a broadcast stream. The term "broadcast stream" denotes broadcast signals provided via, for example, terrestrial TV broadcasts or cable TV broadcasts. The advertisement candidate segment generation unit 10 detects whether an advertisement is included in a broadcast stream, that is, whether an advertisement section is included in the broadcast stream, while receiving the broadcast stream.

As technology for detecting an advertisement section from a broadcast stream, any type of technology well known in the art may be used, and the detection of an advertisement section is not a direct object of the present invention, and thus a detailed description thereof will be omitted. Meanwhile, Korean Patent Application No. 10-2013-0068305 filed by the present applicant relates to "Advertisement detection system and method based on fingerprints", and the advertisement detection method disclosed in this patent may also be used.

The advertisement candidate segment generation unit 10 detects an advertisement section, and generates an advertisement candidate segment for the detected advertisement section, wherein the advertisement candidate segment may be generated by dividing the advertisement section into units of a predetermined time length. Further, the advertisement candidate segment generation unit 10 acquires advertisement candidate segment information about the generated advertisement candidate segment.

The advertisement candidate segment information may include information about a broadcast channel for providing a broadcast stream from which the advertisement section is detected, information about the time at which the broadcast stream from which the advertisement section is detected is provided, and time information about the advertisement section. Further, the advertisement candidate segment information may include fingerprint information for at least a part of the advertisement section. Further, when the detected advertisement is provided as a video, the advertisement candidate segment information may include source digital data of the corresponding advertisement video. When the detected advertisement is provided as audio, the advertisement candidate segment information may include source digital data of the corresponding advertisement audio.

In this way, the advertisement candidate segment generation unit 10 acquires advertisement candidate segment information while generating the advertisement candidate segment.

The matching unit 20 functions to determine whether the advertisement candidate segment generated by the advertisement candidate segment generation unit 10 matches each advertisement segment stored in the advertisement DB 60. The determination of matching/non-matching may be implemented by comparing the fingerprint information of the advertisement candidate segment generated by the above-described advertisement candidate segment generation unit 10 with the fingerprint information of the advertisement segment stored in the advertisement DB 60. Technology for performing matching by comparing pieces of fingerprint information is not a direct object of the present invention, and configurations known in the conventional technology may be used without change, and thus a detailed description thereof will be omitted.

For this, the advertisement DB 60 stores the fingerprint information of each advertisement segment as advertisement segment information. In this case, the term "advertisement segment" denotes an advertisement candidate segment registered as a direct response advertisement or as a normal advertisement in the advertisement DB via a predetermined procedure, which will be described later, using the direct response advertisement determination unit 30, the direct response advertisement registration unit 40, and the direct response advertisement grouping unit 50. That is, each advertisement segment denotes a segment stored after it is determined whether the corresponding advertisement candidate segment is classified as a direct response advertisement or a normal advertisement. The advertisement segment stored in the advertisement DB 60 may further include a segment identifier (ID), a direct response advertisement type identifier, and an instance number, in addition to the above-described advertisement candidate segment information, as the advertisement segment information. Further, the advertisement segment may further include, as other additional information, region information related to a location at which a character string indicating a direct response advertisement is displayed and time information related to a section in which an audio signal indicating a direct response advertisement is located. In addition, the advertisement segment may further include various types of required meta-information depending on the circumstances.

The direct response advertisement determination unit 30 functions to determine whether the advertisement candidate segment is a direct response advertisement if it is determined by the matching unit 20 that an advertisement segment matching the advertisement candidate segment is not present.

As well known in the art, a direct response advertisement (DR ad) denotes an advertisement for attracting viewers' direct responses by exposing information, such as a phone number, an Internet homepage address (Uniform Resource Locator: URL), and a price, at a specific location of an advertisement video for a predetermined period of time so that viewers can order a product related to the advertised product or can request the consultation of the product via, for example, a TV advertising broadcast. Such a direct response advertisement enables a phone number (for example, 800-323-8370) for product purchasing to be exposed at a specific location of an advertisement video in the case of the advertisement video, and the direct response advertisement determination unit 30 may determine whether the corresponding advertisement is a direct response advertisement by checking the exposed phone number.

That is, when the advertisement corresponding to the advertisement candidate segment is a video signal, the direct response advertisement determination unit 30 may determine whether the corresponding advertisement is a direct response advertisement by checking whether a pre-designated character string (for example, a phone number) indicating that the advertisement is the direct response advertisement is included in at least one of the image frames constituting the corresponding advertisement video signal.

In this case, the pre-designated character string may be, for example, a phone number, an Internet homepage address, a price, or the like. For example, as the phone number, only a part of the phone number other than the entire phone number may be designated. For example, when a home shopping company generally uses a telephone exchange number "800", only "800" may be designated. Further, only "www" indicting an Internet address may be pre-designated.

Whether such a character string is included in image frames may be determined using character recognition technology known in the conventional technology. The character recognition technology itself is not a direct object of the present invention and may be implemented using the conventional technology without change, and thus a detailed description thereof will be omitted.

The direct response advertisement determination unit 30 acquires one or more pieces of region information related to a location at which a pre-designated character string is displayed if the pre-designated character string is included in an image frame.

Figure 2:
FIG. 2 is a diagram showing a procedure for acquiring region information.
Figure 2:
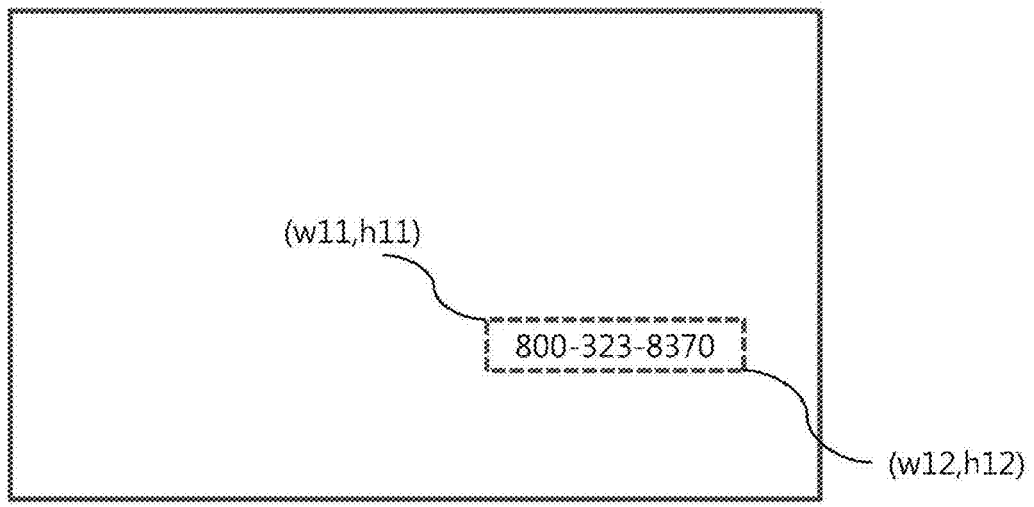

FIG. 2 is a diagram showing a procedure for acquiring region information.

Referring to FIG. 2, an upper picture is obtained by capturing an advertisement video provided through a broadcast stream, and one of the image frames including a preset character string (in FIG. 2, a phone number '800-323-8370') in an advertisement video is illustrated. Here, region information related to the location at which the corresponding character string is displayed may be represented by a rectangle, as shown in a lower portion of FIG. 2. The region information may be represented by R1=[(w11,h11),(w12, h12)] using an upper left vertex (w11, h11) and a lower right vertex (w12, h12) of the rectangle.

As such region information, a plurality of pieces of region information may be present in a single advertisement video, that is, an advertisement candidate segment, and they may be represented by R2=[(w21,h21),(w22,h22)], R3=[(w31, h31),(w32,h32)], . . . , etc. using upper left vertexes and lower right vertexes, as described above.

Such region information is stored as advertisement segment information and is used to group direct response advertisements by the direct response advertisement grouping unit 50, as will be described later.

Meanwhile, the direct response advertisement determination unit 30 may determine whether the corresponding advertisement is a direct response advertisement even when the advertisement is an audio signal. This may be performed by checking, using speech recognition technology, whether a pre-designated audio signal indicating that the corresponding advertisement is a direct response advertisement is included in advertisement audio. In this case, the direct response advertisement determination unit 30 may acquire one or more pieces of time information related to a location at which the pre-designated audio signal appears. The speech recognition technology is not a direct object of the present invention and may be implemented using conventional technology without change, and thus a detailed description thereof will be omitted.

Referring back to FIG. 1, the direct response advertisement registration unit 40 will be described.

The direct response advertisement registration unit 40 functions to store each advertisement candidate segment, determined to be a direct response advertisement by the direct response advertisement determination unit 30, as an advertisement segment in the advertisement DB 60. In this case, the corresponding advertisement candidate segment is stored as the advertisement segment that is the direct response advertisement in the advertisement DB 60.

Together with this, the direct response advertisement registration unit 40 may store information about a region in the image frame in which the pre-designated character string, indicating the direct response advertisement and acquired by the direct response advertisement determination unit 30, is displayed, and information about the character string, in the advertisement DB.

Further, information about reliability of the results of character recognition used upon checking character string information may be additionally stored as advertisement segment information for the advertisement segment in the advertisement DB. As well known in the art, character recognition technology may also detect together the reliability of the results of character recognition. Such reliability is stored together as advertisement segment information in the advertisement DB 60, and may then be used to set a master segment, which will be described later.

Further, when an advertisement is provided as audio, the direct response advertisement registration unit 40 may store time information about the time at which the pre-designated audio signal appears in the corresponding advertisement candidate segment, and information about the designated audio signal in the advertisement DB 60. Furthermore, similarly to the case of video, information about reliability of checking audio signal information may be additionally stored, as the advertisement segment information for the advertisement segment, in the advertisement DB.

Further, an advertisement candidate segment, not determined to be a direct response advertisement by the direct response advertisement determination unit 30, is stored as a normal advertisement segment in the advertisement DB 60.

Meanwhile, the direct response advertisement registration unit 40 sets each advertisement segment stored in the advertisement DB 60 to the master segment of the direct response advertisement. The advertisement segment registered by the direct response advertisement registration unit 40 is one determined to be a direct response advertisement by the direct response advertisement determination unit 30, and the advertisement candidate segment processed by the direct response advertisement determination unit 30 is one for which it is determined by the matching unit 20 that an advertisement segment matching the corresponding advertisement candidate segment is not present. Accordingly, the advertisement candidate segment stored in the advertisement DB 60 by the direct response advertisement registration unit 40 is an advertisement appearing first for the corresponding direct response advertisement, and thus the advertisement segment is set to the master segment of the corresponding direct response advertisement. A detailed operation of a master segment will be described in detail later with reference to the direct response advertisement grouping unit 50.

If it is determined by the matching unit 20 that an advertisement segment matching the advertisement candidate segment is present, and the matching advertisement segment is a direct response advertisement, the direct response advertisement grouping unit 50 functions to group the advertisement candidate segment with advertisement segments that are direct response advertisements stored in the advertisement DB 60.

Here, the term "grouping" denotes the operation of storing advertisement candidate segments so that they are associated with pre-stored advertisement segments depending on identicalness to the pre-stored advertisement segments when storing the advertisement candidate segments as advertisement segments in the advertisement DB.

Figure 3:
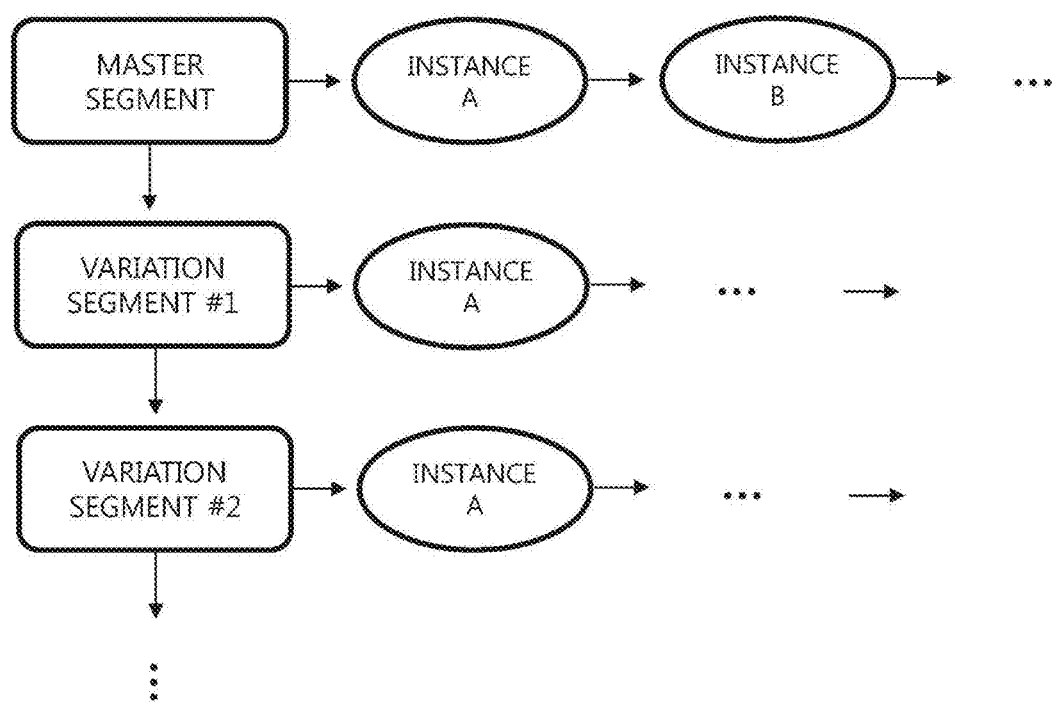
FIG. 3 is a diagram showing the concept of a grouping procedure performed by a direct response advertisement grouping unit 50.

FIG. 3 is a diagram showing the concept of the grouping procedure performed by the direct response advertisement grouping unit 50.

As described above, there are many cases where, for the same advertisement content, direct response advertisements are provided after the information thereof, such as phone numbers, Internet homepage addresses, or prices, has been changed in conformity with the characteristics of countries or the areas of each country, for respective countries or respective areas. The grouping performed by the direct response advertisement grouping unit 50 provides a method of classifying direct response advertisements in consideration of this fact.

Referring to FIG. 3, the vertical line of FIG. 3 shows that the same advertisement content is divided into a master segment and variation segments, wherein the master segment is an advertisement segment corresponding to a direct response advertisement which appears first among direct response advertisements or which is designated by other conditions, and denotes an advertisement segment functioning as a reference point for a specific direct response advertisement.

Each variation segment denotes an advertisement segment which has identicalness to the master segment from the standpoint of details in the advertisement content, but has differences in information such as a phone number, an Internet homepage address, or a price from the master segment, as described above, and it refers to an advertisement segment having a changed form with respect to the master segment.

Variation segments may be configured to include not only cases where pieces of information, such as phone numbers, Internet homepage addresses, or prices, are different from each other, but also cases where locations at which these pieces of information appear in an advertisement video are different from each other, that is, the case described in FIG. 2 in which pieces of region information are different from each other. Further, variation segments may be configured to include cases where details of advertisement content are partially different from each other.

For a specific direct response advertisement, a single master segment may be present and a plurality of variation segments may be present.

Meanwhile, the horizontal line of FIG. 3 shows that advertisement segments having identicalness to the master segment or the corresponding variation segment are associated with each other, and such advertisement segments having identicalness to the master or variation segment are designated as instance segments in the present invention. Instance segments present on the horizontal line extending from the master segment or each variation segment are advertisement segments having identicalness to the master or variation segment on the left side of the corresponding horizontal line.

Figure 4:
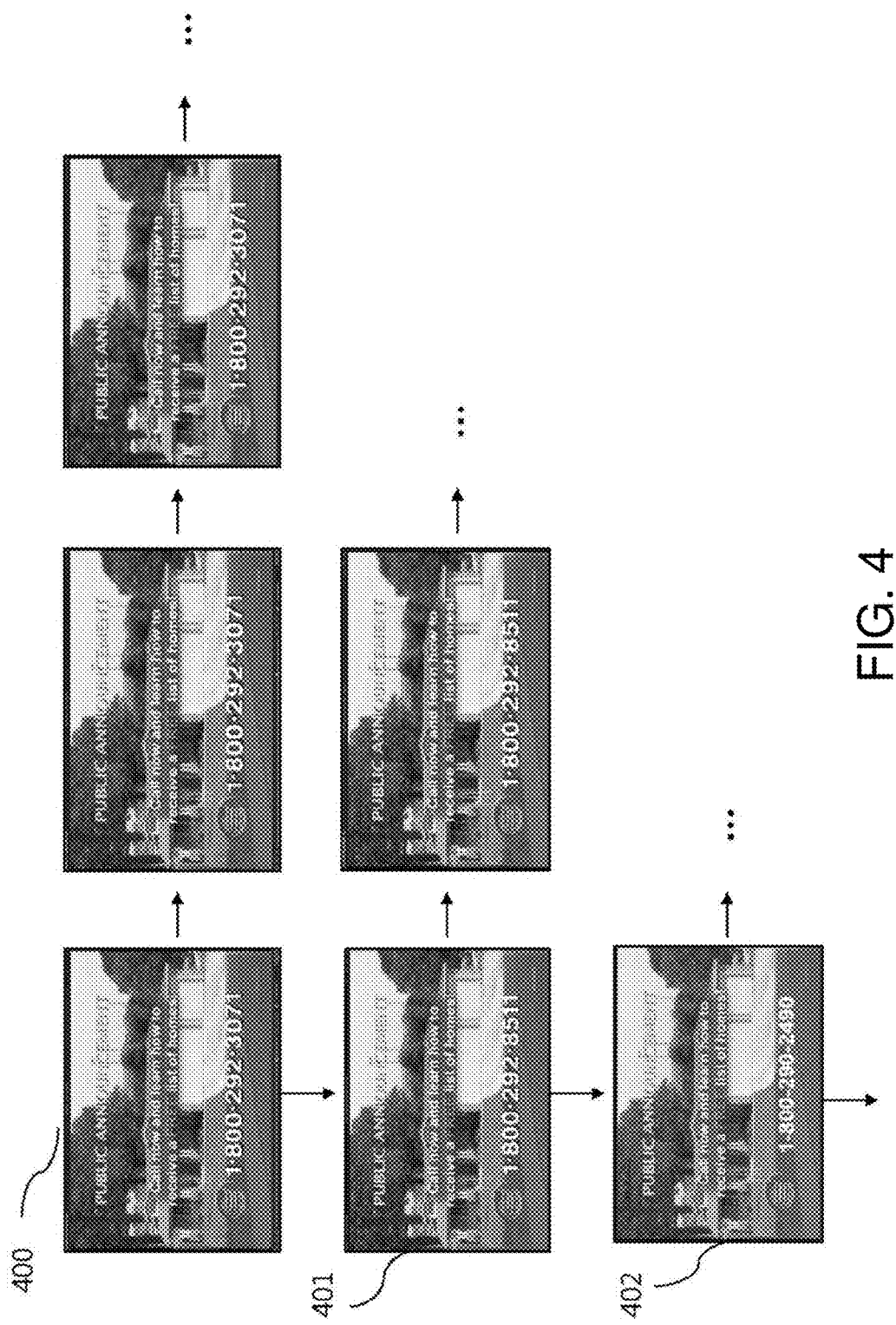
FIG. 4 illustrates a master segment and variation segments, and instance segments of the master and each variation segment, such as those described in FIG. 3, together with actual screens.

FIG. 4 illustrates a master segment and variation segments, and instance segments of the master and each variation segment, such as those described in FIG. 3, together with actual screens.

In FIG. 4, the uppermost portion of a vertical line on a left side denotes a master segment 400 for a specific direct response advertisement, and screens below the master segment respectively denote variation segments 401 and 402. Screens respectively present on the horizontal lines extending from the master segment 400 and the variation segments 401 and 402 denote the instance segments of the corresponding segments.

It can be seen that, if the master segment 400 is compared with the variation segments 401 and 402, phone numbers thereof are different from each other.

If it is determined by the matching unit 20 that an advertisement segment matching an advertisement candidate segment is present, and the matching advertisement segment is a direct response advertisement, the direct response advertisement grouping unit 50 groups the advertisement candidate segment with the advertisement segments which are direct response advertisements stored in the advertisement DB 60, using the method such as that described in FIGS. 3 and 4, classifies the advertisement candidate segment as a master segment or a variation segment, and stores the advertisement candidate segment in the advertisement DB 60, or stores the advertisement candidate segment as an instance segment of the master or variation segment in the advertisement DB 60.

This procedure will be described in detail below.

First, if an advertisement candidate segment for specific direct response advertisement A is first determined to be a direct response advertisement by the direct response advertisement determination unit 30, the advertisement candidate segment is set to a master segment while being stored as an advertisement segment in the advertisement DB 60, as described above.

In this state, if any advertisement candidate segment is generated by the advertisement candidate segment generation unit 10, the matching unit 20 determines whether an advertisement segment (direct response advertisement) matching the advertisement candidate segment is present in the advertisement DB 60. If it is determined that the matching advertisement segment is present, and the advertisement segment is a direct response advertisement, grouping is performed by the direct response advertisement grouping unit 50. In this case, the direct response advertisement grouping unit 50 determines whether the advertisement candidate segment has identicalness to the master segment of the matching advertisement segment by comparing those segments with each other. If the advertisement candidate segment is identical to the master segment of the matching advertisement segment, the advertisement candidate segment is set to the instance segment of the master segment. If it is determined that those segments do not have identicalness, the advertisement candidate segment is set to the variation segment of the master segment.

If both a master segment and a variation segment are present for a specific direct response advertisement (advertisement segment), the direct response advertisement grouping unit 50 sequentially determines whether the advertisement candidate segment has identicalness to the master segment and variation segment of the advertisement segment matching the advertisement candidate segment.

That is, it is determined first whether the advertisement candidate segment has identicalness to the master segment by comparing the segments with each other. If it is determined that the advertisement candidate segment is identical to an advertisement segment that is the master segment, the advertisement candidate segment is set to the instance segment of the master segment.

If it is determined that the advertisement candidate segment is not identical to the advertisement segment that is the master segment, it is determined whether the advertisement candidate segment is identical to an advertisement segment that is the variation segment of the master segment by comparing the segments with each other. If it is determined that the advertisement candidate segment is identical to the advertisement segment that is the variation segment, the advertisement candidate segment is set to the instance segment of the variation segment, whereas if it is determined that the advertisement candidate segment is not identical to the advertisement segment that is the variation segment, the advertisement candidate segment is set to a new variation segment of the master segment. When there are a plurality of variation segments, identicalness to the variation segments is sequentially determined, and then the above-described procedure is performed.

Meanwhile, in the described procedure, the determination of identicalness may be performed using the following method.

That is, there can be used a method of comparing an image of a region corresponding to region information at which a pre-designated character string, indicating a direct response advertisement and included in the advertisement candidate segment, is located, with an image of a region corresponding to region information stored for an advertisement segment (a master segment or each variation segment) which is a comparison target may be used. This method may be performed using, for example, a method of extracting fingerprints of images of the corresponding regions and comparing the fingerprints with each other.

Figure 5:
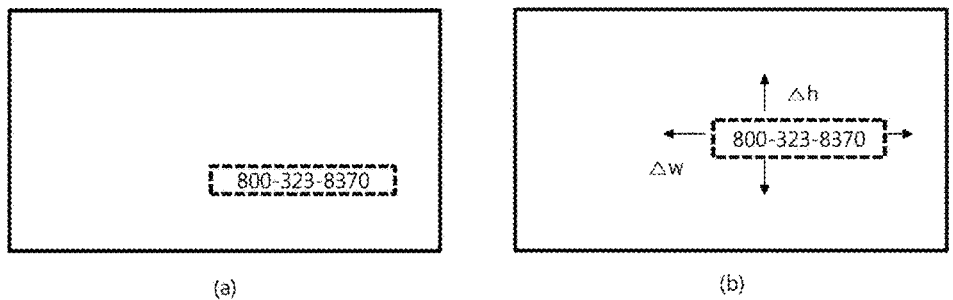
FIG. 5 is a diagram showing a procedure for determining identicalness between pieces of region information.

FIG. 5 is a diagram showing a procedure for determining the identicalness of region information.

FIGS. 5(*a*) and (*b*) illustrate a case where regions corresponding to pieces of region information to be compared have a difference of Δh and Δw. In this way, in a region in which a character string is located, a phenomenon corresponding to location changes or screen expansion of Δh and Δw may occur in vertical and horizontal directions, or image blurring or the like may occur in the corresponding region. In this case, it may be determined that identicalness is present. For this, a distance function of regions which are comparison targets is defined by the following Equation 1, and the presence/non-presence of identicalness may be determined based on the results of calculation of the distance function.

$$\mathrm{Dist}(Rn,Rm){=}\mathrm{Dist}([(w_{n1},h_{n1}),(w_{n2},h_{n2})],[(w_{n1}{+}\alpha\omega, h_{n1}{+}\Delta h),(w_{n2}{+}\Delta\omega,h_{n2}{+}\Delta h)]) \quad \text{[Equation 1]}$$

In this case, Rn and Rm denote respective regions, and w and h denote upper left coordinate values and lower right coordinate values of the corresponding region as described in FIG. 2. Δh and Δw denote differences in vertical height and lateral length between the regions to be compared with each other. When fingerprints are compared with each other, the distance function may be a difference in the results of a comparison between the fingerprints of two comparison regions. If the results of calculation of the distance function are compared with a preset threshold, and a resulting value is equal to or less than the threshold, it is determined that identicalness is present, whereas if the resulting value is greater than the threshold, it is determined that identicalness is not present.

As another method, a method of comparing character string information obtained by recognizing a pre-designated character string, indicating a direct response advertisement and included in an advertisement candidate segment, with the character string information of an advertisement segment which is a comparison target may be used.

Meanwhile, information about a region in which a pre-designated character string, indicating a direct response advertisement and included in an advertisement candidate segment, is located may be obtained, and this region information may be compared with region information stored for an advertisement segment (a master segment or a variation segment) which is a comparison target, and then the presence/non-presence of identicalness may be determined. In this case, whether the pieces of region information are identical to each other may be determined in such a way as to determine that pieces of region information have identicalness not only in a case where coordinate values are completely identical, as shown in FIG. 2, but also in a case where the coordinate values have a difference within the allowable range of a predetermined threshold.

If the above procedure is performed, the direct response advertisement grouping unit 50 groups each advertisement candidate segment based on determination of whether identicalness to advertisement segments (master segment and variation segments) stored in the advertisement DB 60 is present, and stores the corresponding advertisement candidate segment as an advertisement segment in the advertisement DB 60 so that the advertisement segment has the structure of FIG. 7, which will be described later.

Figure 6:
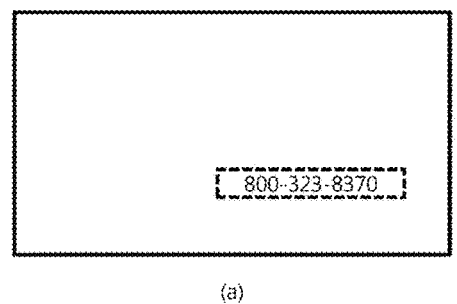
FIG. 6 is a diagram illustrating a procedure for setting a variation segment.
Figure 6:
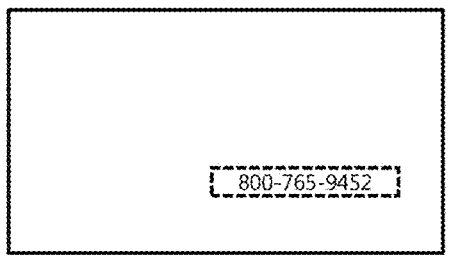
Figure 6:
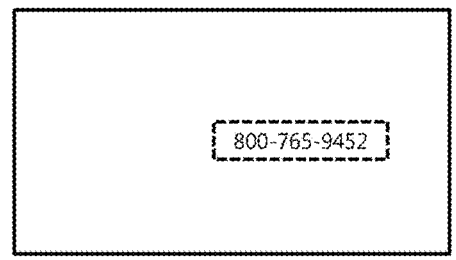

FIG. 6 is a diagram illustrating a procedure for setting a variation segment.

In FIG. 6, when (a) illustrates an advertisement segment which is a pre-stored master segment, and (b) illustrates an advertisement candidate segment having information identical to that of (a) except for a phone number, in comparison with (a), if segments (b) and (a) are compared with each other, in detail, if images corresponding to pieces of region information, or pieces of information of corresponding character strings are compared with each other, segment (b) is grouped as a variation segment of segment (a).

Meanwhile, when, compared to (a), (c) illustrates an advertisement candidate segment having information identical to that of (a) except for a phone number included in region information, if the segment (c) is compared with segment (a), the segment (c) is classified as a variation segment of segment (a).

When (c) and (b) are compared with each other, (c) illustrates a segment in which a phone number included in region information is identical to that of (b) and which has a location differing from that of (b), and thus the segment (c) may be an instance segment of segment (b).

Meanwhile, when an instance segment is set for a master segment, one of the master segment and the instance segment, which has higher reliability information, may be set to the master segment by comparing pieces of reliability information obtained in the character recognition method used to check character string information, as described above. This is the same even for an instance segment of the variation segment.

Further, after grouping has been performed by the direct response advertisement grouping unit 50, grouping results may be displayed via the user interface of a manager's computer, and the manager may check the corresponding details and finally approve or change grouping. In addition, results performed by the direct response advertisement determination unit 30 and the direct response advertisement registration unit 40 may be displayed on the manager computer, and the manager may also approve or change the corresponding details.

Further, although not shown in the drawings, the system 100 may further include a statistics unit, so that various types of information about each direct response advertisement are divided into pieces of information of a master segment and variation segments and are provided. Forms in which specific direct response advertisements are changed and provided via broadcasts may be obtained, together with various types of additional information, by the statistics unit.

FIG. 7 is a diagram showing an example of advertisement segment information stored in the advertisement DB 60 used in the above-described system 100.

Referring to FIG. 7, advertisement segment information may include a segment identifier, a direct response advertisement separator, an instance number, channel_broadcast start time information, section information, fingerprint information, source data information, and additional information.

A segment identifier is an identifier uniquely assigned to identify each advertisement segment.

A direct response advertisement separator is an identifier required to identify whether, as described above, the corresponding segment is a master segment or a variation segment, wherein M in FIG. 7 denotes a master segment and V denotes a variation segment.

The direct response advertisement separators in first and fourth rows of FIG. 7 are identical to each other, wherein, of these segments, a master segment may be identified by an instance number. That is, a segment having an instance number of 0 is a master segment, and a segment having an instance number of 1 denotes an instance segment registered first for the master segment. In the direct response advertisement separators of FIG. 7, numbers appearing after M or V denote segment identifiers.

Meanwhile, all direct response advertisement separators in the second row and the fifth row of FIG. 7 are V, and segment identifiers appearing after V are 990018, and thus the corresponding segments denote variation segments corresponding to the segment identifier of 990018. In this case, a number appearing after 990018 denotes the sequential position of the corresponding variation segment, wherein 1 indicates a first variation segment and 2 indicates a second variation segment.

A channel_broadcast start time denotes the name of a channel through which the corresponding advertisement segment is broadcasted, and information about the start time at which an advertisement is broadcasted through the corresponding channel, and section information denotes information about a time interval, during which the advertisement is played, from the broadcast start time.

Fingerprint information denotes fingerprint information extracted from at least a portion of an advertisement video or audio of the advertisement segment, and source data denotes original digital data of the corresponding advertisement video or audio itself.

As described above, additional information may include region information represented by, for example, lower left coordinate values and upper right coordinate values, the determined character string information when a character string indicating a direct response advertisement is determined, and other information.

Figure 8:
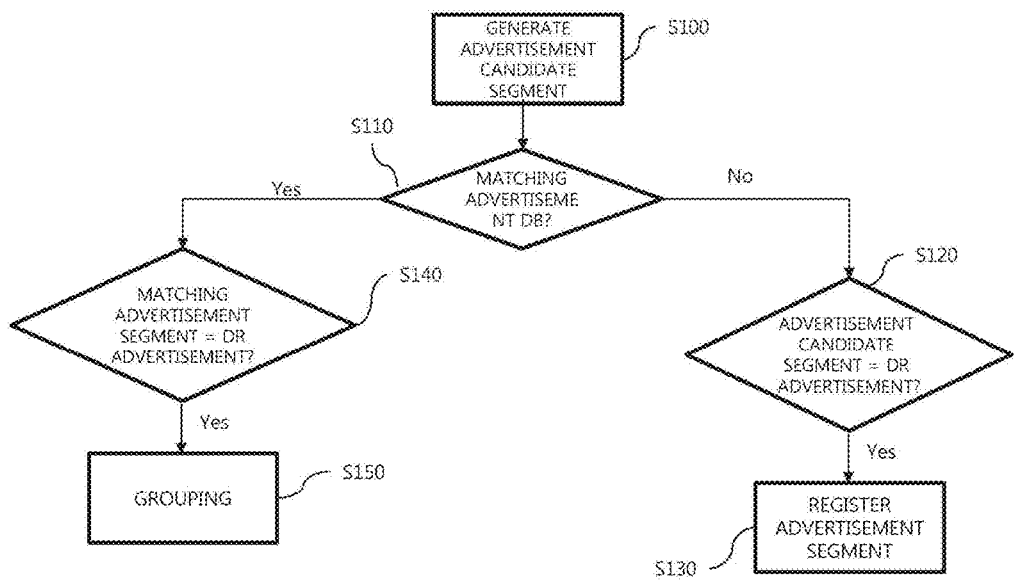
FIG. 8 is a flowchart showing an embodiment of a method performed by the system 100 for detecting and classifying direct response advertisements according to the present invention, which has been described with reference to FIGS. 1 to 7.

FIG. 8 is a flowchart showing an embodiment of a method performed by the system 100 for detecting and classifying direct response advertisements according to the present invention, which has been described in detail with reference to FIGS. 1 to 7.

Referring to FIG. 8, the advertisement candidate segment generation unit 10 generates an advertisement candidate segment for an advertisement section detected from a broadcast stream (S100).

Next, the matching unit 20 determines whether the advertisement candidate segment generated at S100 matches each advertisement segment stored in the advertisement DB (S110).

If it is determined at S110 by the matching unit 20 that an advertisement segment matching the advertisement candidate segment is not present, the direct response advertisement determination unit 30 determines whether the advertisement candidate segment is a direct response advertisement (S120).

If it is determined at S130 that the advertisement candidate segment is the direct response advertisement, the direct response advertisement registration unit 40 stores the corresponding advertisement candidate segment, as an advertisement segment that is the direct response advertisement, in the advertisement DB (S140).

Meanwhile, if it is determined at S110 by the matching unit 20 that an advertisement segment matching the advertisement candidate segment is present, and the matching advertisement segment is a direct response advertisement, the direct response advertisement grouping unit 50 groups the advertisement candidate segment with advertisement segments that are direct response advertisements stored in the advertisement DB 60 (S150).

Figure 9:
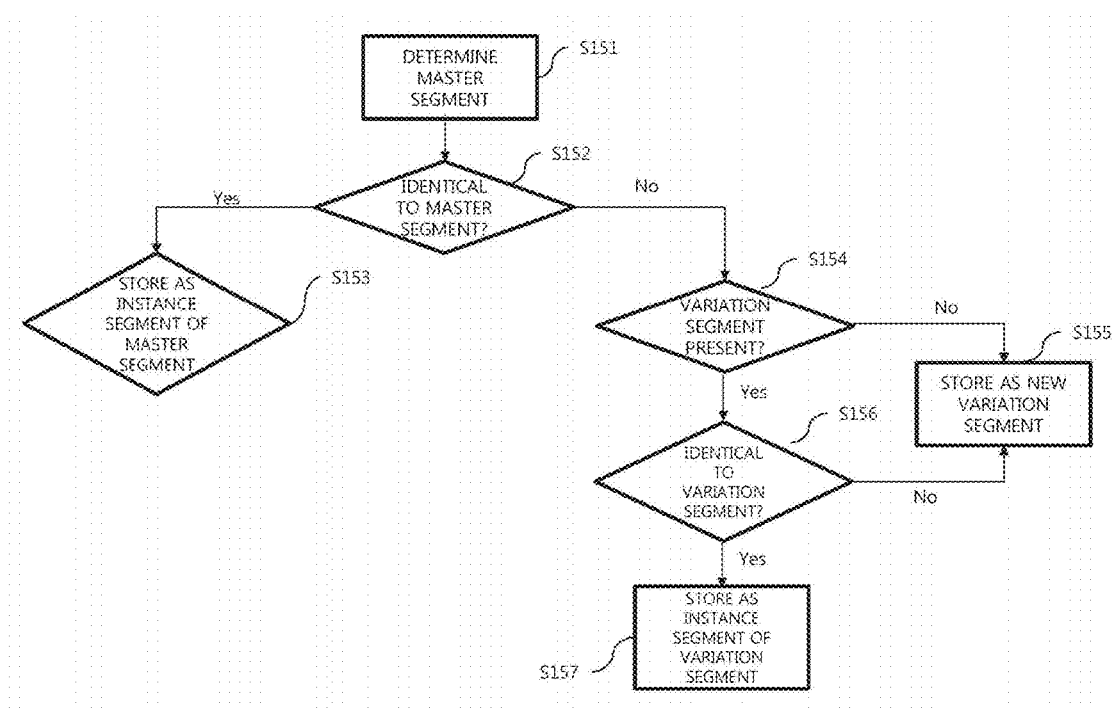
FIG. 9 is a detailed flowchart showing a grouping procedure at step S150.

FIG. 9 is a detailed flowchart showing the grouping procedure at S150 of FIG. 8.

The detailed flowchart of FIG. 9 illustrates a procedure for setting a master segment and a variation segment and a procedure for setting instance segments for the master or variation segment in the grouping procedure, and is based on the details described with reference to FIGS. 3 to 6.

First, among advertisement segments matching an advertisement candidate segment, a master segment is determined from, for example, the advertisement DB 60 configured as shown in FIG. 7 (S151).

Once the master segment is determined, it is determined whether the advertisement candidate segment has identicalness to the master segment (S152).

If it is determined that identicalness to the master segment is present, the advertisement candidate segment is registered and stored, as the instance segment of the corresponding master segment, in the advertisement DB 60 (S153).

If it is determined that identicalness to the master segment is not present, it is determined whether a variation segment is present for the master segment, based on the advertisement DB 60 such as that in FIG. 7 (S154). If it is determined that a variation segment is not present, the advertisement candidate segment is registered as a new variation segment of the master segment (S155).

If it is determined that the variation segment is present, it is determined whether the advertisement candidate segment has identicalness to the variation segment (S156). If it is determined that identicalness to the variation segment is present, the advertisement candidate segment is stored as an instance segment of the variation segment in the advertisement DB 60 (S157). If it is determined that identicalness to the variation segment is not present, the advertisement candidate segment is registered as a new variation segment of the master segment (S155).

Although the preferred embodiments of the present invention have been disclosed for illustrative purposes, those skilled in the art will appreciate that the present invention is not limited to those embodiments and various changes and modifications are possible.

The invention claimed is:

1. A method comprising:
   receiving, by a receiver, a broadcast stream;
   generating an advertisement candidate segment for an advertisement section detected from the received broadcast stream;
   comparing the advertisement candidate segment to each advertisement segment stored in an advertisement database (DB), wherein comparing the advertisement candidate segment to each advertisement segment stored in the advertisement DB comprises comparing a fingerprint of at least a portion of the advertisement candidate segment to a fingerprint of at least a portion of each advertisement segment stored in the advertisement DB;
   based on the comparing, making a first determination that the advertisement candidate segment does not match any advertisement segment stored in the advertisement DB, wherein making the first determination comprises determining that the advertisement candidate segment lacks a threshold extent of similarity with each of the advertisement segments stored in the advertisement DB;
   making a second determination that the advertisement candidate segment is a direct response advertisement; and
   based on making the first and second determinations, storing into the advertisement DB, (i) the advertisement candidate segment, and (ii) information associated with the advertisement candidate segment, wherein the information indicates that the advertisement candidate segment is a master segment of a direct response advertisement.

2. The method of claim 1, wherein the received broadcast stream includes an advertisement section, and wherein the advertisement candidate segment is part of the advertisement section.

3. The method of claim 1, wherein making the second determination that the advertisement candidate segment is a direct response advertisement comprises determining that a pre-designated character string is included in at least one frame of the advertisement candidate segment.

4. The method of claim 3, wherein determining that a pre-designated character string is included in at least one frame of the advertisement candidate segment comprises using a character recognition technique to determine that a pre-designated character string is included in at least one frame of the advertisement candidate segment.

5. The method of claim 1, wherein making the second determination that the advertisement candidate segment is a direct response advertisement comprises determining that a phone number is included in at least one frame of the advertisement candidate segment.

6. The method of claim 5, wherein determining that a phone number is included in at least one frame of the advertisement candidate segment comprises using a character recognition technique to determine that a phone number is included in at least one frame of the advertisement candidate segment.

7. A method comprising:
   receiving, by a receiver, a broadcast stream
   generating an advertisement candidate segment for an advertisement section detected from the received broadcast stream;
   comparing the advertisement candidate segment to each advertisement segment stored in an advertisement database (DB), wherein comparing the advertisement candidate segment to each advertisement segment stored in the advertisement DB comprises comparing a fingerprint of at least a portion of the advertisement candidate segment to a fingerprint of at least a portion of each advertisement segment stored in the advertisement DB;
   making a first determination that the advertisement candidate segment does not match any advertisement segment stored in the advertisement DB, wherein making the first determination comprises determining that the advertisement candidate segment lacks a threshold extent of similarity with each of the advertisement segments stored in the advertisement DB;
   making a second determination that the advertisement candidate segment is a direct response advertisement; and
   storing into the advertisement DB, (i) the advertisement candidate segment, and (ii) information associated with the advertisement candidate segment, wherein the information indicates that the advertisement candidate segment is a master segment of a direct response advertisement.

8. The method of claim 7, wherein the received broadcast stream includes an advertisement section, and wherein the advertisement candidate segment is part of the advertisement section.

9. The method of claim 7, wherein making the second determination that the advertisement candidate segment is a direct response advertisement comprises determining that a pre-designated character string is included in at least one frame of the advertisement candidate segment.

10. The method of claim 7, wherein making the second determination that the advertisement candidate segment is a direct response advertisement comprises determining that a phone number is included in at least one frame of the advertisement candidate segment.

* * * * *